No. 797,661. PATENTED AUG. 22, 1905.
W. CLINE.
APPARATUS FOR PURIFYING GASES OF COMBUSTION.
APPLICATION FILED DEC. 11, 1903.
4 SHEETS—SHEET 1.

WITNESSES:
Chas. J. Hensel,
C. G. Bassler.

INVENTOR.
Wm. Cline.
BY
Wm. R. Gerhart,
ATTORNEY.

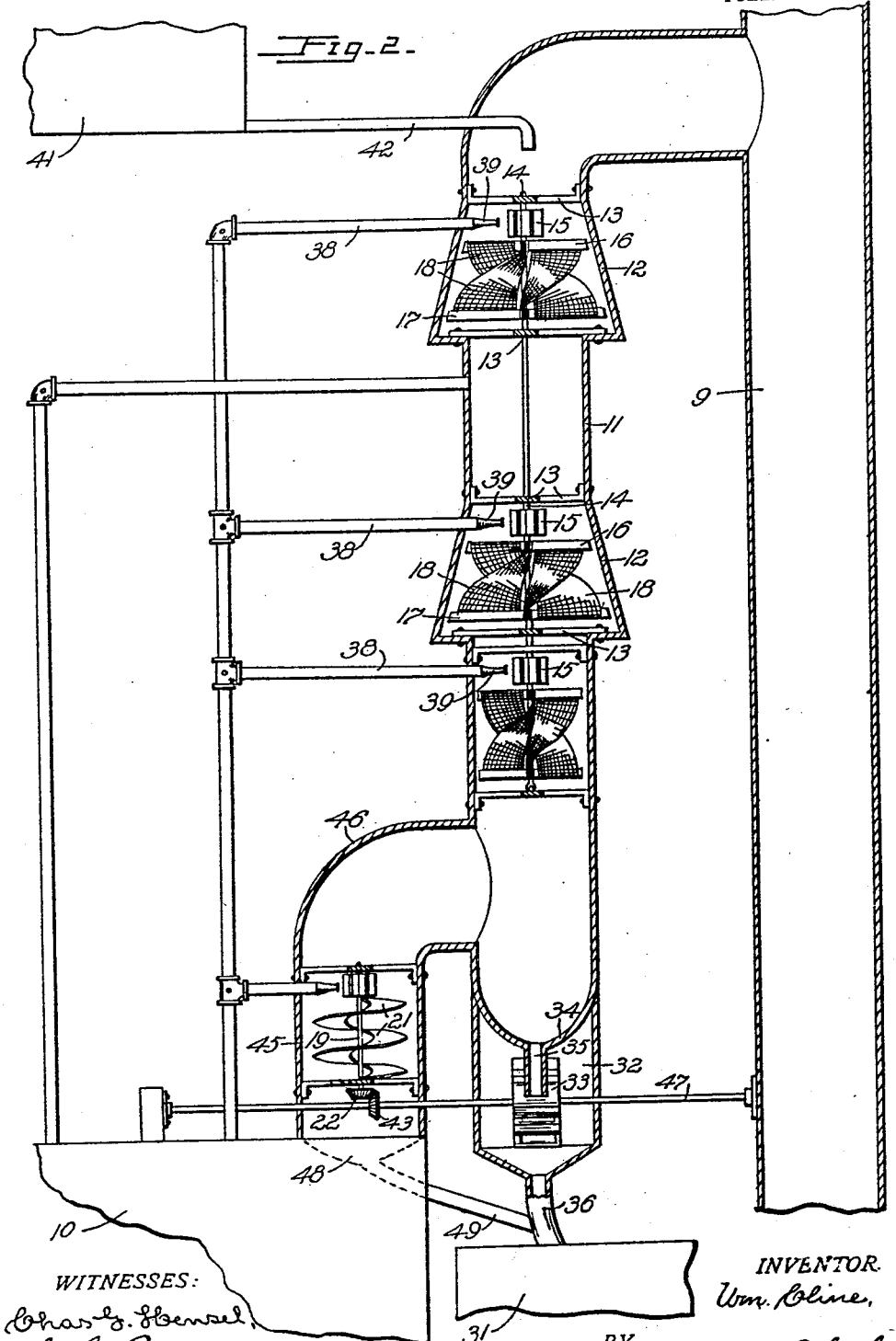

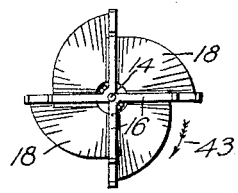
Fig-5-
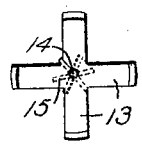
Fig-6-
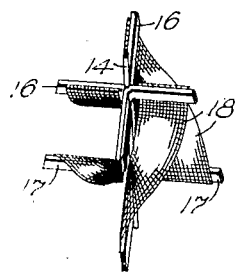
Fig-3-
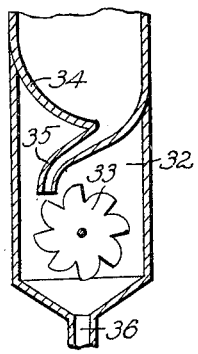
Fig-7-
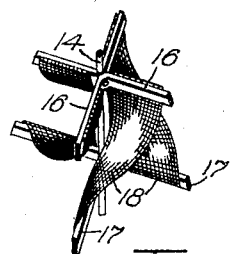
Fig-4-

No. 797,661. PATENTED AUG. 22, 1905.
W. CLINE.
APPARATUS FOR PURIFYING GASES OF COMBUSTION.
APPLICATION FILED DEC. 11, 1903.

4 SHEETS—SHEET 4.

WITNESSES:
Chas. G. Hensel,
C. G. Bassler.

INVENTOR.
Wm. Cline.
BY
Wm. R. Gerhart
ATTORNEY.

UNITED STATES PATENT OFFICE.

WILLIAM CLINE, OF LANCASTER, PENNSYLVANIA.

APPARATUS FOR PURIFYING GASES OF COMBUSTION.

No. 797,661.            Specification of Letters Patent.            Patented Aug. 22, 1905.

Application filed December 11, 1903. Serial No. 184,795.

*To all whom it may concern:*

Be it known that I, WILLIAM CLINE, a citizen of the United States, residing at Lancaster, in the county of Lancaster and State of Pennsylvania, have invented certain new and useful Improvements in Apparatus for Purifying Gases of Combustion, of which the following is a specification, reference being had therein to the accompanying drawings.

This invention relates to improvements in that class of devices designed to separate soot and other extraneous matter from the gases that pass from the fire up through the chimney; and the object of the invention is to permit the free passage to and through the chimney of the gases of combustion and at the same time prevent the passage of the extraneous matter thrown off by the fire with the gases.

The invention consists in the construction and combination of the various parts, as hereinafter fully described, and then pointed out in the claims.

Figure 1:
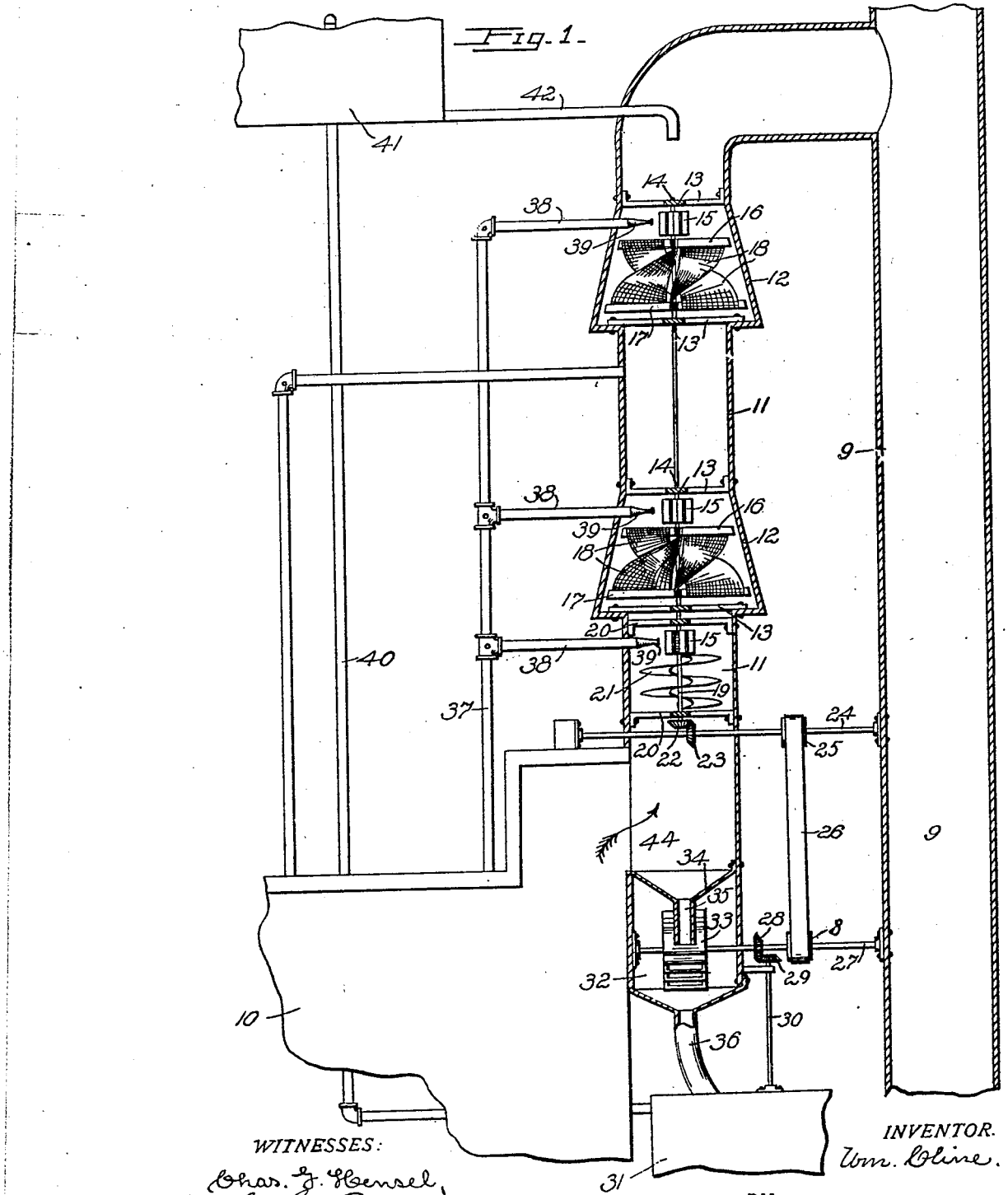
Figure 8:
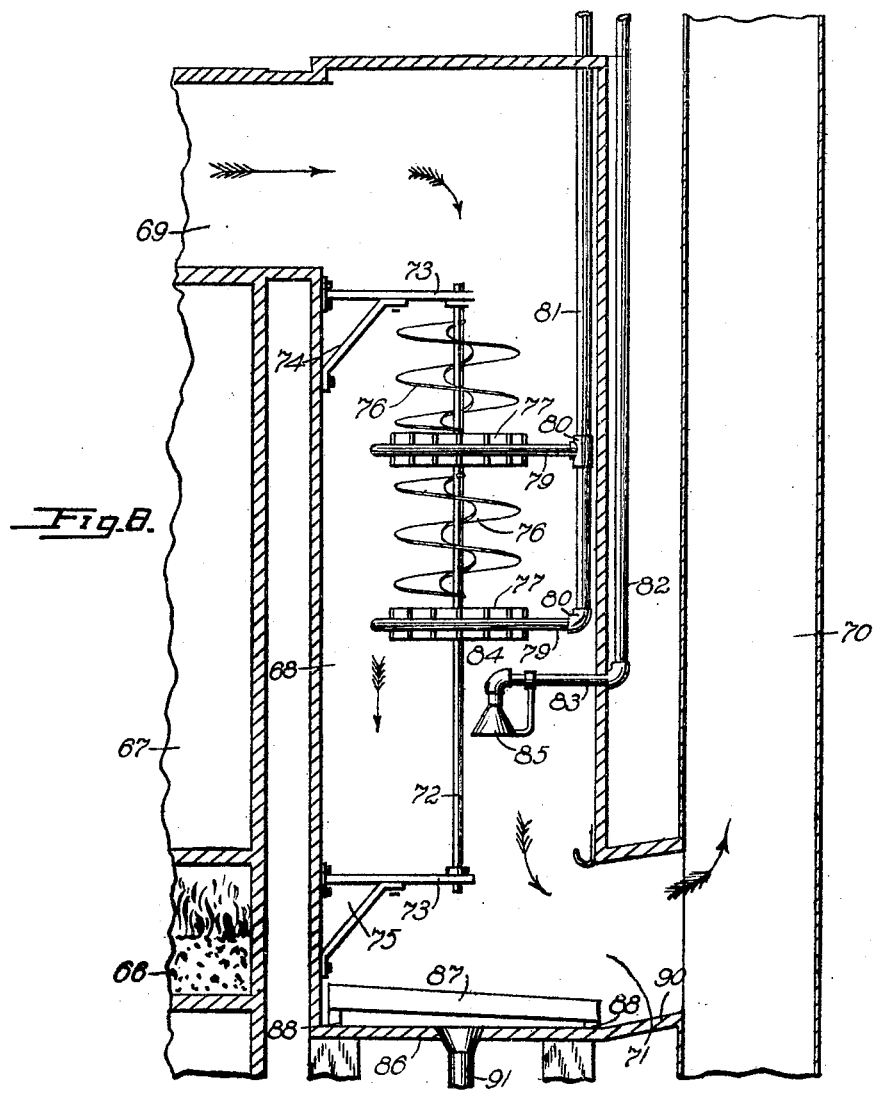
Figures 9, 11:
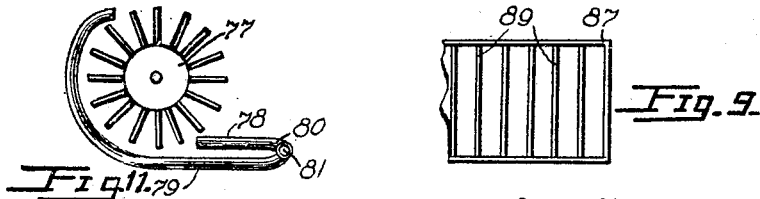

In the accompanying drawings, forming a part of the specification, Figure 1 is an elevation of a device embodying my improvements, parts being shown in section; and Fig. 2, a similar view of a modification of the construction shown in Fig. 1. Figs. 3 and 4 are perspective views of one of the revolving sieves, and Fig. 5 a top plan view thereof. Fig. 6 is a top plan view of a pair of the cross-bars wherein the vertical shafts are journaled, and Fig. 7 a section of the water-wheel chamber transversely of the shaft, and Fig. 8 illustrates a modification in the construction. Fig. 9 is a top plan view of a section of the frame in the bottom of the separator-flue in Fig. 8, and Fig. 10 a longitudinal vertical section of said frame. Fig. 11 is a top plan view of one of the water-wheels and its pipes shown in Fig. 8.

Similar numerals indicate like parts throughout the several views.

Referring to the details of the drawings, more particularly Figs. 1 and 2, 9 indicates the smoke stack or chimney; 10, the furnace, heater, or stove, and 11 the circular vertical sections of the flue containing the operating mechanism. In Fig. 1 and the main part of Fig. 2 vertical sections 11 are connected by frustocones 12, the bases whereof extend beyond the walls of the vertical sections below them and the upper ends of which are of the same diameter as the vertical sections above them, which frustocones form sieve-chambers.

At the top and bottom of each sieve-chamber are cross-bars 13, at the intersection of which are bearings for the vertical shafts 14. Just below the upper journal-bearing of each sieve-chamber there is secured on vertical shaft 14 a water-wheel 15, having vertically-disposed buckets. Immediately under each of said water-wheels are cross-bars 16, and above the lower journal-bearings are similar cross-bars 17, both being secured to shaft 14, but cross-bars 17 are longer than cross-bars 16. These cross-bars are in pairs, the bars of each pair being disposed at right angles the one with the other, and the shaft 14 passes through the intersection of each pair of said cross-bars. Attached to cross-bars 16 and 17 are spirally-disposed sieves 18, which disposition is obtained by attaching the upper end of each sieve to an end of one of the upper cross-bars 16 and the lower end to the corresponding end of the cross-bar 17 at right angles with said end of the cross-bar 16 and disposed with reference thereto in the direction in which said sieves will move. These sieves are constructed of wire-netting. In the vertical section 11 under the lowest fan-chamber is located a vertical shaft 19, similar to those above it and journaled in the intersection of cross-bars 20. This shaft 19 also has on its upper end a water-wheel 15, with vertically-disposed buckets, and on said shaft 19, below the water-wheel, is secured a spirally-disposed plate 21, forming a suction-fan, as shown in Fig. 1.

Shaft 19 passes through and extends below cross-bar 20 and has on said extension a bevel-gear 22, meshing with a bevel-gear 23 on a horizontal shaft 24. In Fig. 1 shaft 24 has thereon a pulley 25, connected by a belt 26 with a pulley 8 on a horizontal shaft 27. On shaft 27 is a bevel-gear 28, meshing with a bevel-gear 29 on a vertical shaft 30, which extends down to waste-tank 31. The aforesaid pulleys, belt, and bevel-gears 28 and 29 are all located outside of flue 11 12. Shaft 27 extends through a chamber 32, located directly below flue 11 12, and in said chamber and on shaft 27 is a water-wheel 33. The upper end of chamber 32 is funnel-shaped, as shown at 34, to receive water from flue 11 12 and to feed it to water-wheel 33 through discharge-pipe 35, and in the bottom of said chamber 32 is an outlet-pipe 36, that discharges into a water-tank 31.

Connected with the source of supply is an upright water-pipe 37, having branches 38 opposite each of the water-wheels 15, and these branches 38 extend to and through the adjacent walls of the flue-sections and are provided with nozzles 39, wherethrough water is ejected against the buckets of said water-wheels 15.

40 is a water-pipe feeding supply-tank 41, from which a delivery-pipe 42 conveys the water to and through the wall of the flue above the uppermost sieve and discharges it onto said sieve. This is simply an auxiliary contrivance and is not intended to coöperate with water discharged through branches 38.

In operation water is ejected from the branches 38 of water-pipe 37 against the buckets of water-wheels 15, causing the sieves and the spiral suction-fan 21 to revolve in the direction of the arrow 43, Fig. 5, the movement of said spiral suction-fan being aided by its connection with the water-wheel 33 in chamber 32 through the gearing on shafts 19, 24, and 27. The smoke passes from the furnace, heater, or stove 10 into flue 11 12, as shown by arrow 44, and the draft in said flue is increased by the suction movement of spiral fan 21 and of the sieves 18. The sieves intercept and hold the extraneous matter thrown off by the fire with the gases of combustion, while the water from branches 38 washes said matter from the sieves and carries it downward.

In Fig. 2 the vertical section 45 of the flue is located by the side of the body thereof and is connected therewith by an elbow 46, and in said vertical section 45 is located the spiral fan 21. The gearing for conveying power from water-wheel 33 to the spiral fan 21 is modified accordingly. The shaft 47, on which said water-wheel 33 is mounted, has a bevel-gear 48, meshing with the bevel-gear 22 on shaft 19, and below section 45 is a basin 48, having a discharge-pipe 49, that empties into the outlet-pipe 36.

Figure 10:
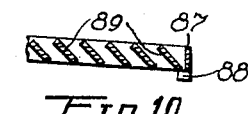

In Figs. 8, 9, 10, and 11 is illustrated a further modification in the construction whereby the products of combustion and the water for separating the extraneous matter from the gases of said products pass in the same direction through the flue leading to the smoke-stack, in which flue the extraneous matter is separated from said gaseous products and prevented from passing to the smoke-stack. In these figures, 66 is the fire-box; 67, a boiler; 68, the separator-flue; 69, the smoke-flue leading from the fire-box to the top of the separator-flue; 70, the smoke-stack, and 71 the passage between the bottom of the separator-flue and the smoke-stack. 72 is a vertical shaft journaled in the ends of arms 73 of brackets 74 and 75, respectively, attached to a wall of separator-flue 68, bracket 74 being located below the opening leading from smoke-flue 69 into said separator-flue 68 and bracket 75 adjacent to the passage 71 between the separator-flue and the smoke-stack. On shaft 72 are rigidly secured a plurality of spirally-disposed plates forming fans 76, adapted to draw the products of combustion from smoke-flue 69 into separator-flue 68 and to force said products down the separator-flue. On shaft 72 are water-wheels 77, whereby said shaft 72 is actuated. Motion is imparted to water-wheels 77 by water ejected against one side of each through a branch pipe 78 and against the other side by a branch pipe 79, both said branch pipes for each of water-wheels 77 extending from the same joint 80 connecting them with vertical supply-pipe 81, branch pipes 79 curving around the sides of the water-wheels, as shown in Figs. 8 and 11. 82 indicates the exhaust-pipe, extending down the outside of separator-flue 68 and having an arm 83 thereon extending into said separator-flue. The inner end 84 of arm 83 is turned downward and discharges into a sprayer 85, which it supports. Above and extending entirely over the bottom 86 of separator-flue 68 is a frame 87, having side and end bars and legs or feet 88. Transversely of this frame are sloping slats 89, having their ends secured in the side bars of said frame, the lower edge of each of these slats extending beneath the upper edge of that adjacent thereto, as shown in Fig. 10. The outer end of the flue-bottom 86 is sloped upward, as shown at 90, and in the center of said bottom is a discharge-pipe 91.

In operation the products of combustion are drawn downward through separator-flue 68 by fans 76 and the discharge from exhaust-pipe 82, while the water from branch pipes 78 and 79 and said discharge from exhaust-pipe 82 washes the extraneous matter from the products of combustion and carries it down onto slats 89, from which it is washed down to and through discharge-pipe 91, while the gases of combustion pass to and up smoke-stack 70. The sloping and lapping of slats 89 prevents the uprising of said extraneous matter.

Having thus described my invention, what I claim as new, and desire to secure by Letters Patent, is—

1. In an apparatus of the character described, a flue leading from the heater to the offtake or chimney, a rotatable shaft traversing said flue, spirally-disposed sieve-plates in said flue, radiating from the shaft and traveling therewith, a water-wheel secured to the shaft above the spirally-disposed sieve-plates and a pipe arranged to discharge liquid against the periphery of the water-wheel to thereby rotate the shaft and to spray the liquid upon the spirally-disposed sieve-plates.

2. In an apparatus of the character described, a flue leading from the heater to the offtake or chimney, a rotatable shaft traversing the flue, a series of sieves in said flue each consisting of spirally-disposed sieve-plates radiating from said shaft and traveling therewith, a series of water-wheels each secured to said shaft and each arranged above a sieve in series, and a series of pipes each arranged to discharge liquid against the periphery of a water-wheel to thereby rotate the shaft and to spray the liquid upon the sieves.

3. In an apparatus of the character described, a flue leading from the heater to the offtake or chimney, a frusto-conical enlargement furnishing a chamber in said flue, a rotatable shaft traversing said chamber, spirally-disposed sieve-plates radiating from the shaft and arranged to rotate therewith in said chamber, a water-wheel secured to said shaft above the sieve-plates and a pipe arranged to discharge liquid against the periphery of the water-wheel to thereby rotate the shaft and to spray liquid upon the sieve-plates.

4. In an apparatus of the character described; a flue leading from the heater to the offtake or chimney, a mechanism for screening the gases located within said flue, a means for spraying the screening mechanism with liquid, a water-wheel located at or near the base of the flue and adapted to be rotated by the liquid from the screens, a shaft traversing the flue and carrying said water-wheel, a spiral suction-fan located in the flue and means controlled by the shaft for driving said suction-fan.

WILLIAM CLINE.

Witnesses:
C. G. BASSLER,
WM. R. GERHART.